United States Patent
Lee et al.

[11] Patent Number: 5,934,544
[45] Date of Patent: Aug. 10, 1999

[54] APPARATUS AND METHOD FOR MAKING AN AUTOMOTIVE BUMPER BEAM

[75] Inventors: Yong-ho Lee, Kyungju-si; Mun-yong Lee, Pusan-si, both of Rep. of Korea

[73] Assignees: Hyundai Motor Corporation, Seoul; Sung Woo Metal Co., Ltd., Pusan-si, both of Rep. of Korea

[21] Appl. No.: 09/057,592

[22] Filed: Apr. 9, 1998

[30] Foreign Application Priority Data

Apr. 10, 1997 [KR] Rep. of Korea ...................... 97-13282

[51] Int. Cl.⁶ .................................................. B21D 39/02
[52] U.S. Cl. ........................... 228/146; 228/17.5; 72/168; 72/177; 72/181; 29/897.2
[58] Field of Search ............................. 72/166, 168, 171, 72/177, 181; 29/897.2; 228/146, 155, 173.7, 17.5

[56] References Cited

U.S. PATENT DOCUMENTS

| 4,267,954 | 5/1981 | Smith | 72/181 |
| 5,104,026 | 4/1992 | Sturrus | 72/166 |
| 5,395,036 | 3/1995 | Sturrus | 228/146 |

FOREIGN PATENT DOCUMENTS

| 1255014 | 1/1961 | France | 72/181 |
| 1466831 | 3/1989 | U.S.S.R. | 72/181 |
| 1790461 | 1/1993 | U.S.S.R. | 72/181 |

*Primary Examiner*—Daniel C. Crane
*Attorney, Agent, or Firm*—Finnegan, Henderson, Farabow, Garrett & Dunner, L.L.P.

[57] ABSTRACT

Disclosed is an apparatus and method for making an automotive bumper beam by a single roll forming. The apparatus of the present invention comprises an uncoiler; a straightener; a brake press; a first group of roll formers; a second group of roll formers; a final sweep roll former; adjuster; welding member; and cutting member. The method of the present invention is comprising of a step of preparing the steel sheet; a step for forming the tubular cross-sectional shape on the steel sheet; a step for forming a sweep on the steel sheet; a step for adjusting the tubular cross-sectional shape of the steel sheet; a step for welding two flanges to each other at their terminal ends; and a step for cutting the steel sheet to the predetermined length. The bumper beam manufactured according to the present invention has the tubular cross-sectional shape comprising the front wall having an central indented portion, the top and bottom walls, the upper and lower rear walls, and the upper and lower inner walls having respective flanges, by a single roll forming process.

21 Claims, 9 Drawing Sheets

APPARATUS AND METHOD FOR MAKING AN AUTOMOTIVE BUMPER BEAM

FIELD OF THE INVENTION

The present invention relates to an apparatus and method for making an automotive bumper beam and, more particularly, to an apparatus and method which can make a high strength bumper beam by a single roll-forming process.

BACKGROUND OF THE INVENTION

Generally, bumpers are mounted on front and rear sides of a vehicle to absorb the impact from collisions with other vehicles and objects. Bumpers act to decrease vehicle damage and minimize injury to persons inside the vehicle.

The bumper comprises a bumper beam mounted on the front and rear sides of the vehicle in a direction along a width of the same, an impact absorbing member provided on a front side of the bumper beam, and a bumper cover covering both the bumper beam and impact absorbing member to aesthetically conceal and protect the same.

The present invention relates to the apparatus and method for manufacturing the bumper beam. Conventionally, a bumper beam, when seen at a cross-section, includes a main body which is formed having a "W" shape with the two openings facing the vehicle, and a plate welded over the two openings such that two semi-circular tubes are formed in the bumper beam.

However, the manufacture of such a prior art bumper beam has drawbacks in that because two separate steps are needed—forming the main body and welding the plate to the main body—the process is complicated and time consuming. This ultimately acts to increase the overall manufacturing costs of the vehicle. In addition, as the plates used to cover the two openings are made through a pressing operation, much scrap is generated in forming the plates. Finally, a rim for welding the plates must be formed on the main body, further complicating the manufacturing process and increasing the overall weight of the vehicle.

To remedy these problems, a roll-forming process has come to be used in recent times in which a steel strip is roll-formed into a tubular cross section by a single roll-forming process. An example of such a manufacturing method is disclosed in U.S. Pat. No. 5,395,036 to Peter Sturrus et al.

However, in the above method, before forming each wall of a bumper beam, pre-operation for preparing a steel sheet having a web is needed so that the manufacturing process is complicated and the apparatus takes large space. Furthermore, the front wall is formed by welding both side edges of the steel sheet to each other so that the impact resistance reduces.

SUMMARY OF THE INVENTION

The present invention has been made in an effort to solve the above problems.

It is an object of the present invention to provide an apparatus and method for making an automotive bumper beam that can strengthen an impact resistance of the bumper beam.

It is another object of the present invention to provide an apparatus and method for making an automotive bumper beam to reduce the weight of the bumper and manufacturing costs by simplifying a manufacturing process.

To achieve the above objects, the present invention provides an apparatus and method for making an automotive bumper beam by a single roll forming process. The apparatus of the present invention comprises an uncoiler; a straightener; a brake press; a first group of roll formers; a second group of roll formers; an adjuster; an welding member; and a cutting member. The method of the present invention is comprising of a step of preparing the steel sheet; a step for forming the tubular cross-sectional shape on the steel sheet; a step for forming the sweep on the steel sheet; a step for adjusting the tubular cross-sectional shape of the steel sheet; a step for welding two flanges to each other at their terminal ends; and a step for cutting the steel sheet to the predetermined length. The bumper beam manufactured according to the present invention has a tubular cross-sectional shape comprising the front wall having a central indented portion, the top and bottom walls, the upper and lower rear walls, and the two inner walls having respective flanges.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF PREFERRED EMBODIMENTS

Preferred embodiments of the present invention will now be described in detail with reference to the accompanying drawings.

Figure 1:
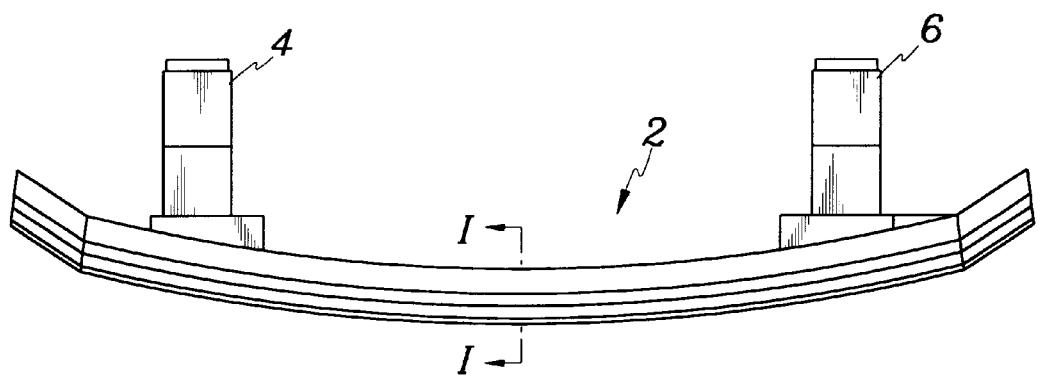
FIG. 1 is a top schematic view of a bumper where a bumper beam made by an apparatus and method according to a preferred embodiment of the present invention may be employed.
Figure 2:
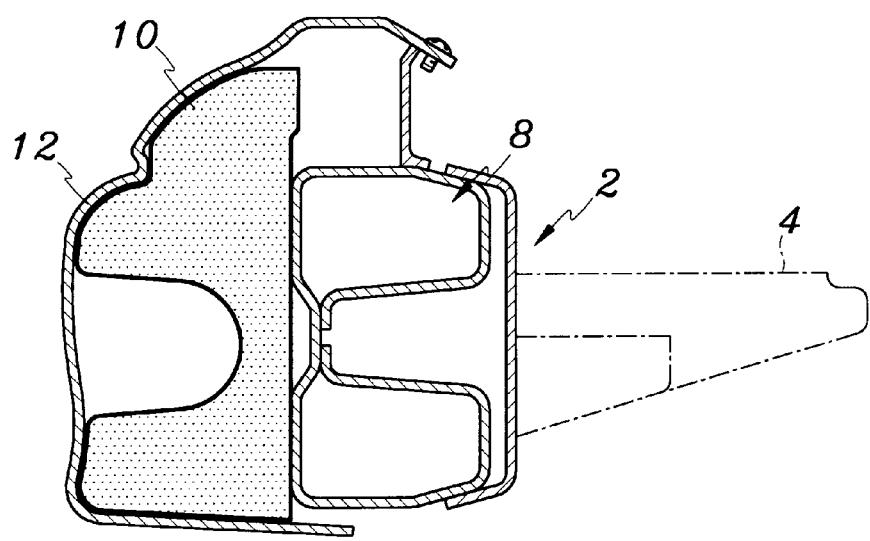
FIG. 2 is a cross-sectional view taken along line I—I of FIG. 1.

Referring to FIGS. 1 and 2, a bumper assembly 2 typically comprises a bumper beam 8, a bumper cover 12 covering the bumper beam 8, an impact absorbing member disposed between one inner wall of the bumper cover 12 and the bumper beam 8, and stays 4 and 6 integrally formed substantially perpendicular to the bumper beam cover 12 and through which the bumper assembly 2 is mounted to front and rear walls of a vehicle along a width of the same.

Figure 3A:
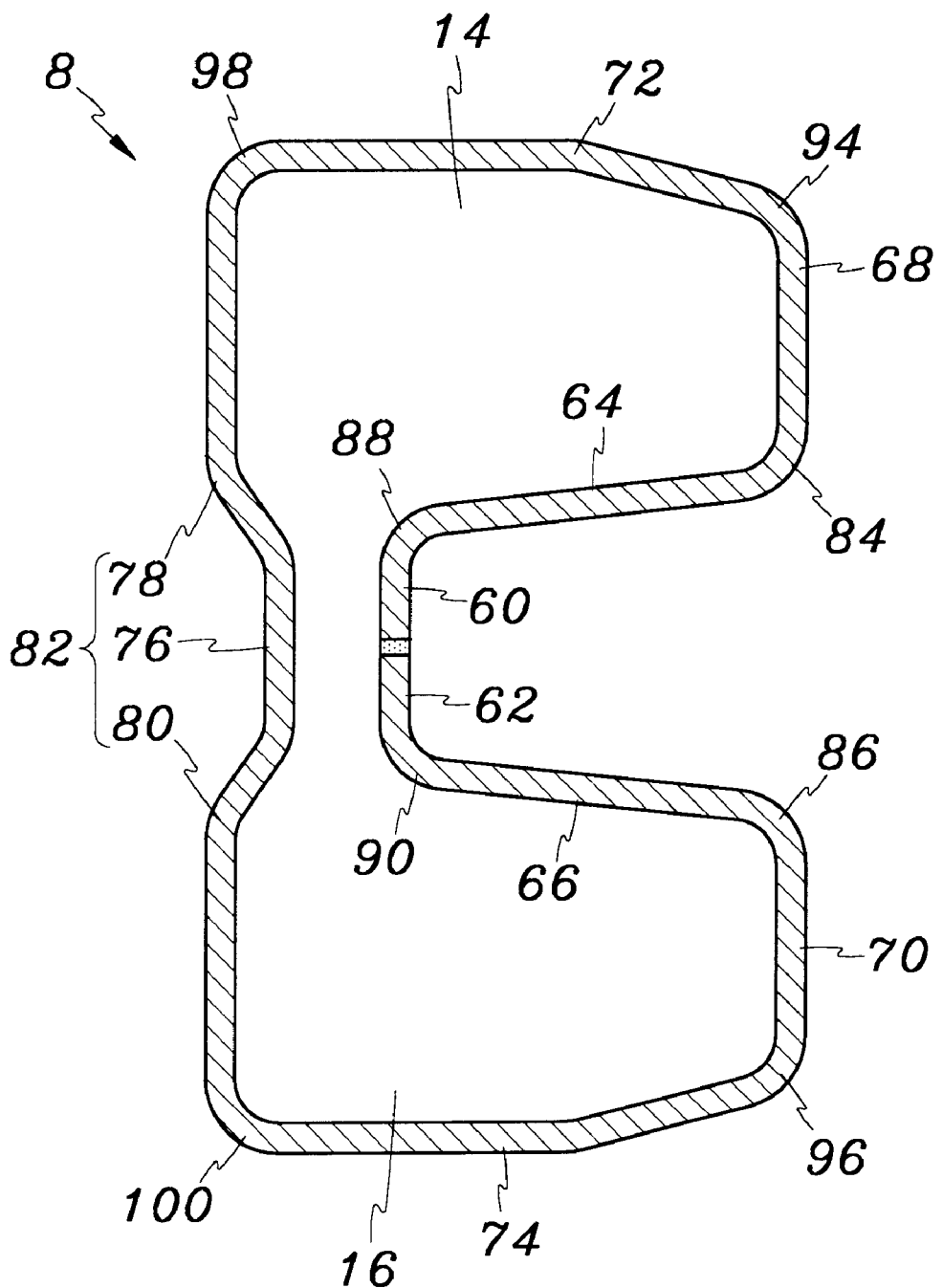
FIG. 3(A) is an enlarged cross-sectional view of a bumper beam shown in FIG. 2 according to a first preferred embodiment.
Figure 3B:
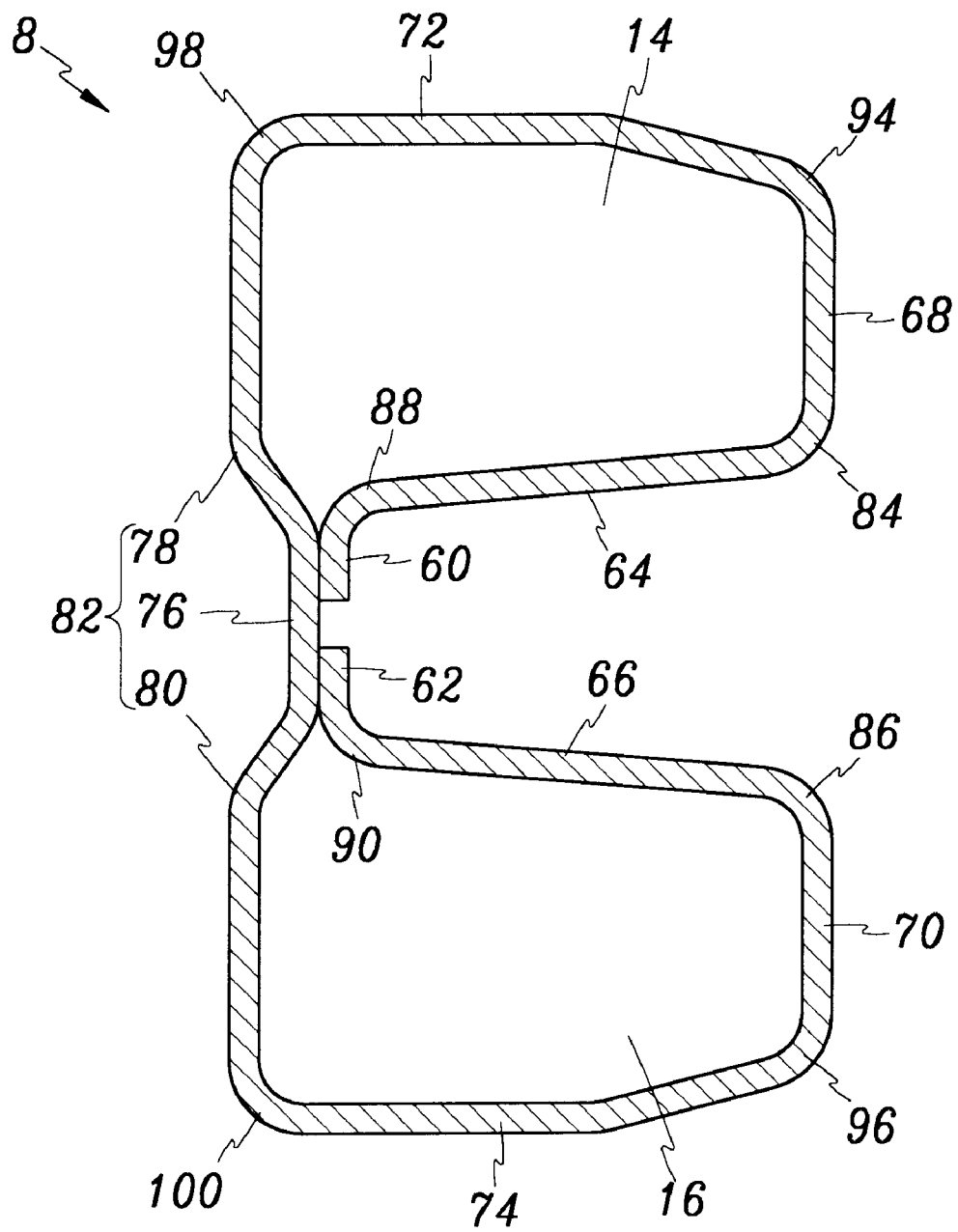
FIG. 3(B) is an enlarged cross-sectional view of a bumper beam shown in FIG. 2 according to a second preferred embodiment.

As shown in FIGS. 3A and 3B, the bumper beam 8 is substantially tube-shaped.

More in detail, the bumper beam 8 comprises a front wall 82 having an indented central portion 76; a top wall 72, one end of which is connected to an upper end of the front wall 82 by a first boundary bend 98; an upper rear wall 68, an upper end of which is connected to the other end of the top wall 72 by a second boundary bend 94; an upper inner wall 64, one end of which is connected to a lower end of the upper rear wall 68 by a third boundary bend 84, an upper flange 60 connected to the upper inner wall 64 by a fourth boundary bend 88; a bottom wall 74, one end of which is connected to a lower end of the front wall 82 by a fifth boundary bend 100; a lower rear wall 70, a lower end of which is connected to the other end of the bottom wall 74 by a sixth boundary bend 96; a lower inner wall 66, one end of which is connected to an upper end of the lower rear wall 70 by a seventh boundary bend 86; and a lower flange 62 connected to the lower inner wall 66 by an eighth boundary bend 90.

Thus, an upper chamber 14 is defined by the front, top, upper rear, and upper inner walls 82, 72, 68 and 64, and an lower chamber 16 is defined by the front, bottom, lower rear and lower inner walls 82, 74, 70 and 66.

FIG. 3A discloses the first preferred embodiment according to the present invention in which the upper and lower flanges 60 and 62 are abutted to each other at their terminal ends. In this embodiment, the two chambers are connected to each other through a channel formed between the indented central portion 76 of the front wall 82 and the flanges 60 and 62.

FIG. 3B discloses the second preferred embodiment according to the present invention in which the upper and lower flanges 60 and 62 are abutted to the indented portion 76 of the front wall 82.

An apparatus for making the bumper beam 8 structured as in the above will be described hereinafter.

Figure 4:
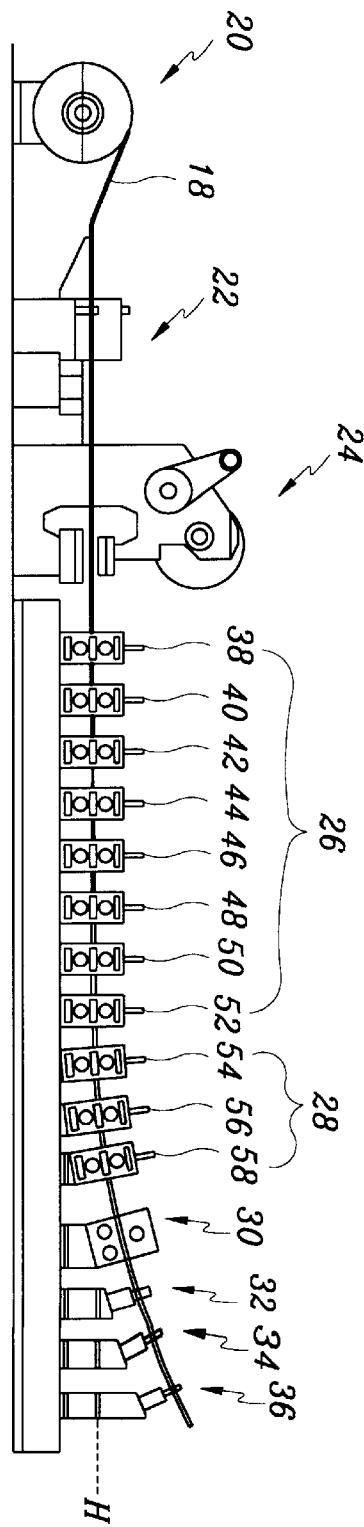
FIG. 4 is a schematic view of an apparatus for making a bumper beam in accordance with a preferred embodiment of the present invention.

Referring to FIG. 4, the apparatus comprises an uncoiler 20 and a straightener 22, the straightener flattening the steel sheet 18 unrolled by the uncoiler 20.

The apparatus further comprises a brake press 24 for forming various holes on the steel sheet 18 directed from the straightener 22. The various holes are required when assembling a finished bumper assembly 2 in FIG. 1.

The uncoiler 20, straightener 22, and brake press 24 all act to feed the steel sheet 18 through the rest of the roll forming apparatus.

The apparatus further comprises a first group of roll formers 26. The steel sheet 18 fed through the brake press 24 is gradually bent to be formed having the tube shape as shown in FIG. 3, while passing through the first group of roll formers 26 comprising a plurality of roll formers 38, 40, 42, 44, 46, 48, 50, and 52. The roll formers 38, 40, 42, 44, 46, 48 and 52 of the first group 26 are arranged such that base planes of each roll former of the first group 26, through which the indented central base portion 76 of the bumper beam 8 passes, are disposed on an identical horizontal plane H.

Figure 5:
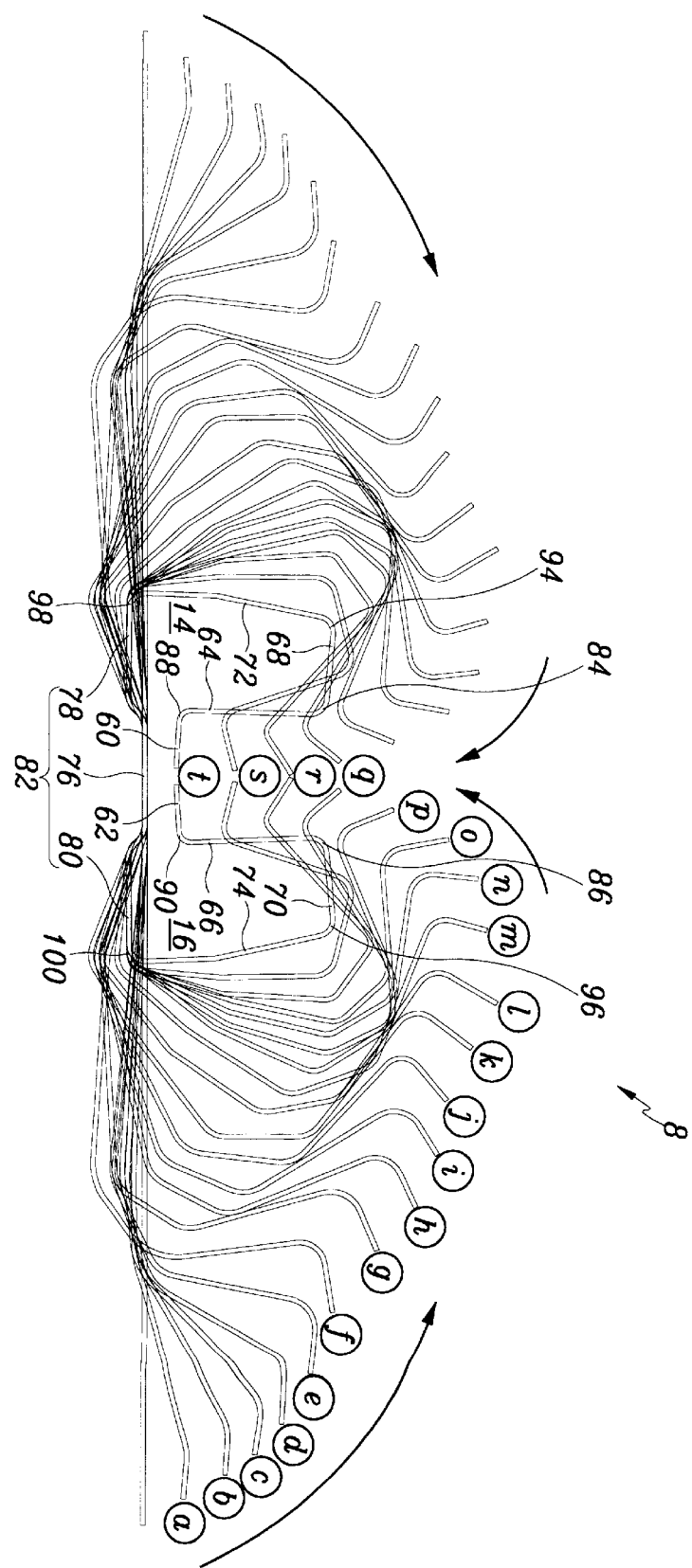
FIG. 5 is a view for illustrating a bumper beam forming process realized by a apparatus and method according to a preferred embodiment of the present invention.

Referring to FIG. 5, italic alphabet a~t shows the steps through which a steel sheet is formed into a bumper beam having a tubular cross sectional shape by passing through the steps a~t.

FIGS. 6A, 6B, 6C and 6D respectively discloses the roll formers at the first step a, the tenth step j, the sixteenth step p and the twentieth step t in the FIG. 5, for forming each wall of the bumper beam by using the roll forming apparatus according to the present invention. Each roll former of the first group 26 includes upper roller 102 and lower roller 104, through which the steel sheet 18 is continuously bent to a tube.

Figure 6A:
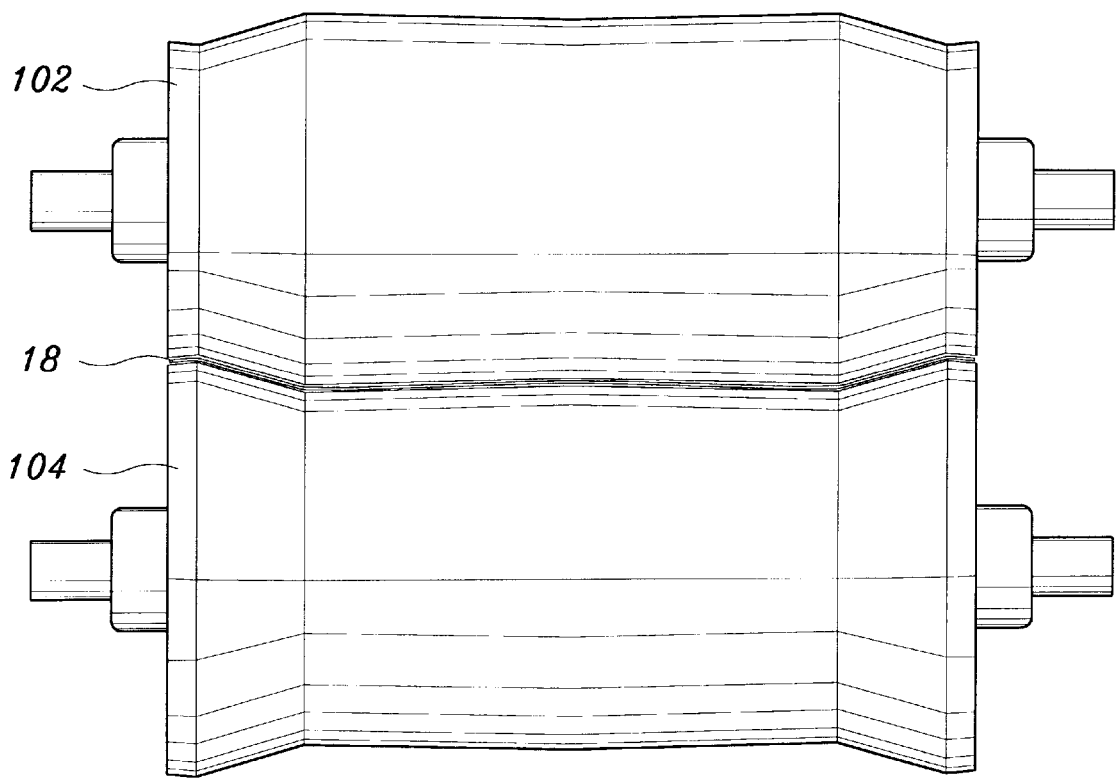
FIGS. 6A, 6B, 6C and 6D are the views of rollers in each roll former for illustrating the manufacturing process.
Figure 6B:
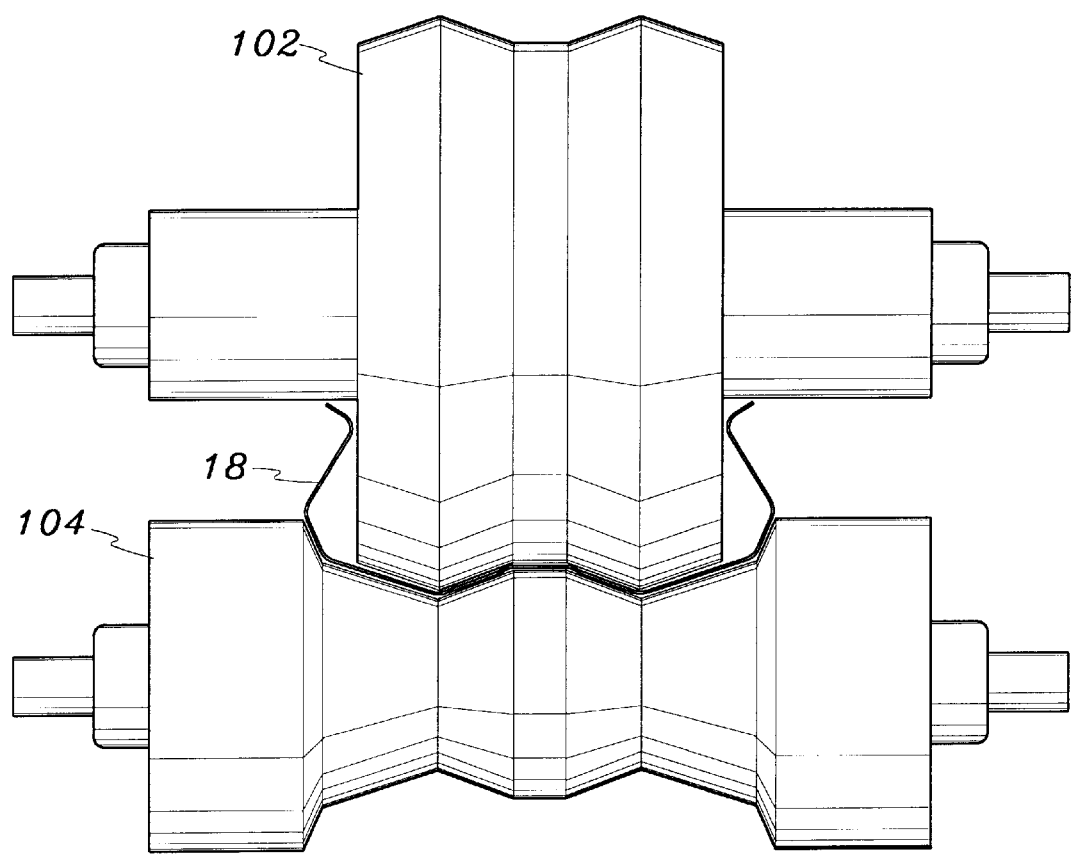
Figure 6C:
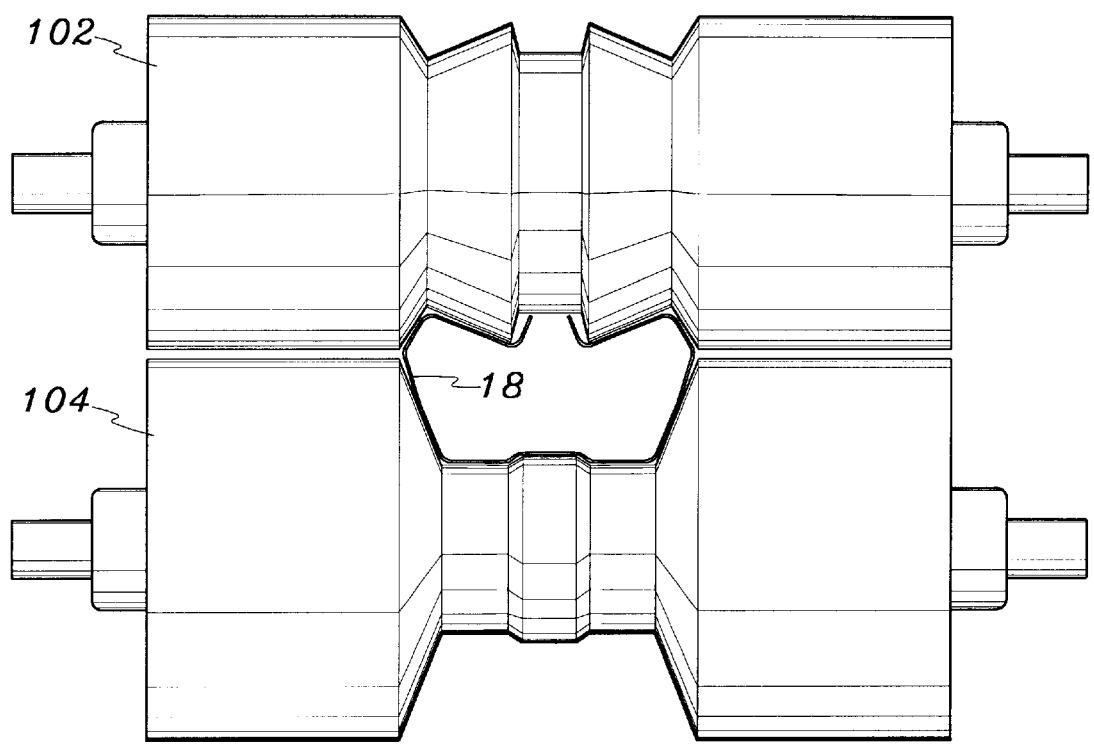
Figure 6D:
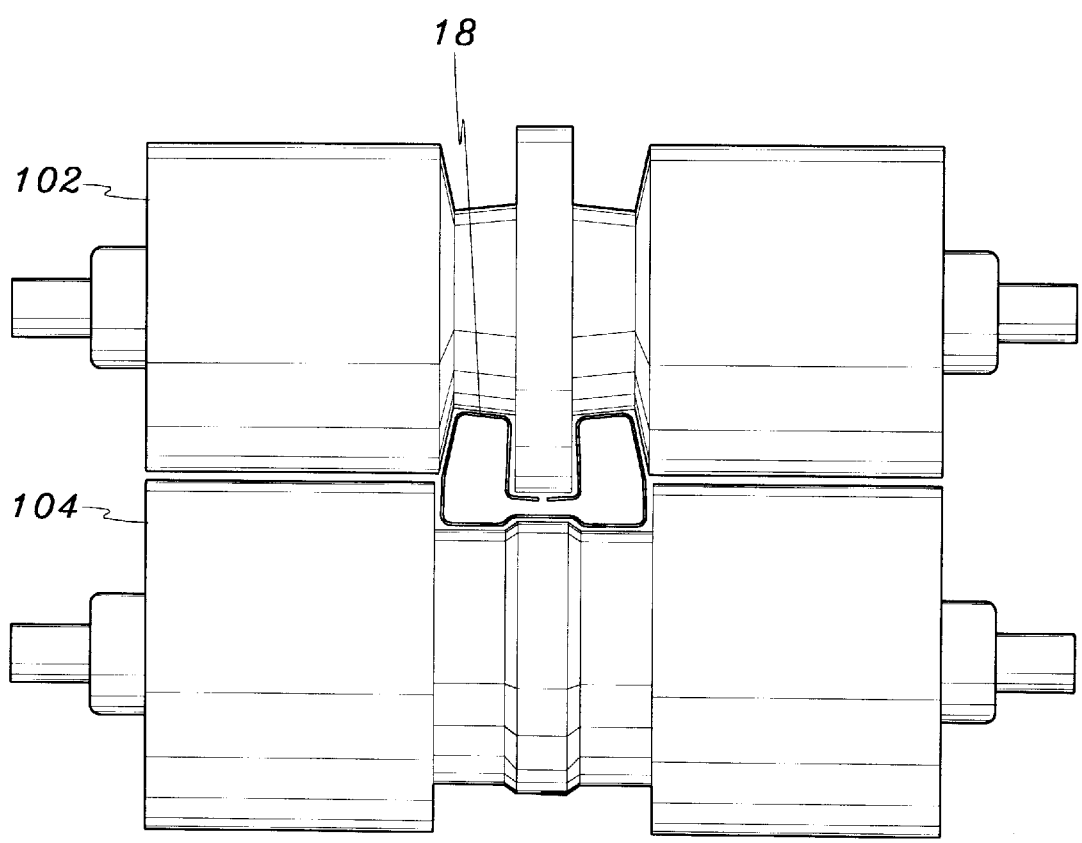

More in detail, FIG. 6A discloses a first roll former for forming the inner walls 64 and 66 having the flanges 60 and 62 in advance by passing the steel sheet 18 through between a pair of rollers 102 and 104 of the first roll former having surface with obtuse angles for bending the steel sheet. FIG. 6B discloses a tenth roll former continuously to bend the steel sheet 18 at the bending portion to form the walls of the bumper beam 8 by passing the steel sheet 18 through between a pair of rollers 102 and 104 of the tenth roll former having rolling surface with less obtuse angles than the angles at the previous step. FIG. 6C discloses a sixteenth roll former to form the walls and indented portion 76 on the front wall 82 by passing the steel sheet 18 through between a pair of rollers 102 and 104 of the sixteenth roll former. FIG. 6D discloses a last roll former to form the steel sheet 18 into a predetermined tubular cross sectional shape by passing the steel sheet 18 through between a pair of rollers 102 and 104 of the last roll former.

All the rollers are not disclosed in drawings but each rollers of the first group of roll former 26 have the corresponding shape to each state in FIG. 5.

FIGS. 5 and 6 respectively discloses a process and a shape of roller at each roll forming step for first embodiment as shown in FIG. 3(A).

The apparatus further comprises a second group of roll formers 28 having a plurality of roll formers 54, 56, and 58. After being passed through the first group of roll formers 26, the steel sheet 18 is fed through the second group of roll formers 28 to be formed having a first sweep.

The roll formers 54, 56 and 58 are arranged such that each base plane, through which the indented central portion 76 of the bumper beam 8 passes thereof, has a predetermined angle with respect to the horizontal plane H.

More in detail, the roll formers 54, 56 and 58 are progressively arranged in an upward position and in a larger angle with respect to the horizontal plane H. Therefore, the steel sheet 18 is formed having a first sweep while passing through the roll formers 54, 56 and 58.

The apparatus further comprises a final sweep roll former 30 which provides final sweep on the steel sheet 18 fed from the second group of roll formers 28.

The final sweep roll former 30 is arranged such that a base plane thereof, through which the indented central portion 76 of the bumper beam 8 passes, has a predetermined angle, preferably larger than the angle between the base plane of the roll former 58 and the horizontal plane H, with respect to the horizontal plane H.

The apparatus further comprises an adjustor 32 through which the shape of the steel sheet 18 is adjusted into accurate dimensions needed for the bumper beam 8, as shown in FIG. 3.

The apparatus further comprises a welding member 34 through which the upper and lower flanges 60 and 62 of the steel sheet 18 are welded to each other at their terminal ends (see FIG. 3).

The apparatus further comprises a cutting member 35 through which the steel sheet 18 is cut to a predetermined length to complete the formation of the bumper beam 8.

The process of manufacturing the bumper beam 8 using the roll forming apparatus shown in FIG. 4 and structured as in the above will now be described in detail with reference to FIGS. 3 and 5.

A steel sheet is prepared, by successively passing through an uncoiler 20, a straightener 22 and a brake press 24, for main manufacturing process, in advance. The steel sheet unrolled from the uncoiler 20 is flattened by the straightener 22 and then is preforated at least once by break press 24, the preforation required for assembling a finished bumper assembly 2 in FIG. 1. The steel sheet 18 passed through the previous preparing process is provided to main manufacturing process.

The main process for manufacturing the bumper beam 8 according to the present invention comprises the steps of: forming the steel sheet 18 into a tubular cross-sectional shape; forming a sweep on the steel sheet; adjusting the shape of the steel sheet into accurate dimensions needed for the bumper beam; welding terminal ends of the steel sheet 18 to each other; and cutting the steel sheet 18 provided from the welding stage to the predetermined length of a bumper beam. The steps for forming a bumper beam depend on the shape of a final bumper beam product.

In the steps for forming the bumper beam, the step for forming the steel sheet into the cross-sectional tube shape is the most important. Basically, the tube is formed by gradually bending each wall so the side edges of the steel sheet as to roll in until abutting to the central portion of the steel sheet. In this step, some walls are bent step by step in order, while the other walls are gradually bent at the same time.

The process of the tube being formed will now be described in detail with reference to FIG. 5 hereinafter.

The steel sheet is formed into the tubular cross-sectional shape having the two chambers as follows.

First, the upper and lower inner walls 64 and 66 respectively having the upper and lower flanges 60 and 62 are formed on the steel sheet. Next, the front wall 83 having an indented central portion, the top and bottom walls 72 and 74 and the upper and lower rear walls 68 and 70 are formed having a predetermined length by bending first and fifth boundary bends 98 and 100, second and sixth boundary bends 94 and 96, and third and seventh boundary bends 84 and 86 respectively upward. Last, all the walls are continuously bending at the same time through the last steps for forming the predetermined tubular cross-sectional shape of a bumper beam 8.

In the step for forming the inner walls 64 and 66 having the flanges 60 and 62, respectively, each boundary bend 84 and 86 between the upper and lower rear walls 68 and 70 and the inner walls 64 and 66 is gradually bent inward and, at the same time, each flange 60 and 62 is bent outward through approximately 5 steps.

The inner walls 64 and 66 and the top and bottom walls 72 and 74 are not completed in the step forming the inner walls 64 and 66 and the flanges 60 and 62, but are gradually bent inward at the second, sixth, first, and fifth boundary bends 94, 96, 98 and 100.

After forming the inner walls 64 and 66 having the flanges 60 and 62, respectively, the second and sixth boundary bends 94 and 96 between the upper and lower rear walls 68 and 70 and the top and bottom walls 72 and 74, and the first and fifth boundary bends 98 and 100 between the top and bottom walls 72 and 74 and the front wall 82 are gradually bent at the same time. Each central portion of the top and bottom walls 72 and 74 is formed having an inward wide obtuse angle through the step as shown in FIG. 3.

Through the steps, the boundary bends 84, 86, 94, 96, 98 and 100, are bent inward such that the flanges 60 and 62 face to the indented central portion 76 of the front wall 82 with an predetermined interval and abut each other at the terminal ends to result in forming the tube having the upper and lower chambers 14 and 16.

While, the tube can be formed as the second preferred embodiment wherein the flanges 62 and 64 are abutted to the indented central portion of the front wall as shown in FIG. 3B. This type will enhance the impact resistance.

Also, the central portions of the top and bottom walls 72 and 74 take obtuse angles inward for strengthening the impact resistance.

The front wall 82 is structured having the indented central portion 76 so as to provide additional strength against impact to the bumper 8. This formation is realized progressively during the steps of forming the upper and lower rear walls 68 and 70 and the top and bottom walls 72 and 74.

In forming each wall of the chambers 14 and 16, firstly the inner walls 64 and 66 having the flanges 60 and 62 are bent roughly in advance and then all the walls including inner walls 64 and 66 are bent gradually at the same time, while the flanges 60 and 62 are bent to the top and bottom walls 72 and 74 gradually, to avoid these portions from springing back during the final step and to decrease the load given to each roll former 38~58.

All the rollers at every step are not disclosed in drawings but the rollers of the first roll former group 26 have the corresponding shape to each state in FIG. 5.

After being passed through the first group of roll formers 26, the steel sheet 18 is fed through the second group of roll formers 28 to be formed having a first sweep.

The steel sheet 18 is then passed through a final sweep roll former 30 which continues the shaping of the steel sheet 18, and next to an adjustor 32 which adjusts the shape into accurate dimensions needed for the bumper beam 8 as shown in FIG. 3.

Finally, the steel sheet 18 is fed to a welding member 34, through which the upper and lower flanges 60 and 62 are welded to each other at their terminal ends (see FIG. 3), and is cut to a predetermined length by a cutting member 36 to complete the formation of the bumper beam 8.

Accordingly, in the present invention, the complicated step of welding a separate plate as in the prior art is avoided.

In the preferred embodiments of the present invention, although the second group of roll formers 28 immediately follows the first group of roll formers 26, the present invention is not limited to this configuration and it is possible to add a welding means between the roll forming means and the first sweep forming means.

In this disclosure, there is shown and described only the preferred embodiment of the invention, but, as aforementioned, it is to be understood that the invention is capable of use in various other combinations and environments and is capable of changes or modification within the scope of the inventive concepts as expressed herein.

What is claimed is:

1. A method for forming, from a single sheet of material having two opposing edge portions, a tubular vehicle bumper beam having two longitudinally extending chambers connected by a central portion of a continuous front wall common to both chambers, the method comprising:

initially bending the sheet of material to form a plurality of walls defining the two chambers, two opposing edge portions of the sheet being formed into respective flanges with edges said flanges being formed while said sheet is substantially flat and subsequently positioning the edges of the flanges in opposition to one another so that the flanges form a web opposite the central portion of the continuous front wall.

2. The method of claim 1 wherein the step of forming the web is accomplished by abutting and joining the edges of the flanges together at a distance from the central portion of the continuous front wall.

3. The method of claim 1 wherein the step of forming the web is accomplished by joining the flanges to the central portion of the continuous front wall joining the chambers.

4. A method for making a vehicle bumper beam having a tubular cross section and comprising two longitudinally extending chambers defined by a plurality of walls including a single continuous front wall common to both chambers, respective spaced pairs of inner and outer side walls and respective rear walls, the chambers being connected to one another by a central portion of the continuous front wall and a web, the method for making a vehicle bumper beam comprising the steps of:

forming the plurality of walls defining the respective chambers by successively forming a series of bend lines in a single sheet of material having two opposed parallel longitudinally extending edge portions and a longitudinal centerline while forming the edge portions into respective flanges said flanges being formed while said sheet is substantially flat; and subsequent to forming the walls defining the chambers forming the web by positioning the flanges in opposition to one another, proximate the longitudinal centerline and parallel to the front wall.

5. The method of claim 4, wherein the step of forming the web is accomplished by abutting and joining the edges of the flanges together at a distance from the central portion of the continuous front wall forming a channel between the front wall and edges.

6. The method of claim 5, wherein the central portion of the continuous front wall is indented inward toward the flanges.

7. The method of claim 4, wherein the step of forming the web is accomplished by joining the flanges to the central portion of the continuous front wall.

8. The method of claim 7 wherein the central portion of the continuous front wall is indented inward toward the flanges.

9. The method of claim 4, wherein each of the chambers and flanges are formed by sequentially bending the sheet of material to respectively form the outer side wall, the rear wall, the inner side wall, and the flange of each chamber.

10. The method of claim 9 wherein the chambers and flanges are each formed simultaneously with one another.

11. The method of claim 10 further comprising a step of welding the flanges to the central portion of the continuous front wall.

12. The method of claim 11 wherein the central portion of the continuous front wall is indented inward toward the flanges.

13. The method of claim 10 further comprising a step of welding the flanges to each other at their edges.

14. The method of claim 13 wherein the central portion of the continuous front wall is indented inward toward the flanges.

15. The method of claim 10 wherein the two chambers' rear and outer side walls, are intermediately formed at the step forming the two chambers' inner side walls having respective upper and lower flanges.

16. The method of claim 10, wherein the outer side walls are intermediately formed at the step forming the rear walls.

17. The method of claim 10 further comprising a step forming an obtuse angle between a first and a second edge of the outer side walls of each chamber; the edges of the outer side walls being bent towards the inner side walls.

18. The method of claim 12 further comprising a step of forming an indentation in the central portion of the continuous front wall at approximately the same time the step forming the outer side walls occurs.

19. The method of claim 4, wherein the walls are gradually formed by simultaneously bending the sheet of material at different locations forming a series of boundary bends.

20. The method of claim 9, wherein the walls are formed by a series of steps comprising:

intermediately forming the inner side walls of the chambers and the flanges by passing sheet of material through a roll former;

intermediately forming the chambers' front walls, outer side walls, and rear walls, simultaneously by continuously passing the sheet of material through a roll former, exactly forming the chambers' front walls, the outer side walls, rear walls, and inner side walls as well as the flanges by continuously passing the sheet of material through a roll former; and simultaneously forming an indentation on the central portion of the continuous front wall; and bending the sheet of material into final form by placing the edges of the flanges in opposition to one another and forming a web between the chambers' inner side walls; by continuously passing the sheet of material through a roll former.

21. An apparatus for making a vehicle bumper beam having a tubular cross section and comprising two longitudinally extending chambers defined by a plurality of walls including a single continuous front wall common to both chambers, respective spaced pairs of inner and outer side walls and respective rear walls, the chambers being connected to one another by a central portion of the continuous front wall and a web formed by two flanges, the apparatus comprising:

a first roll former having a first pair of rollers for intermediately forming the inner side walls for each of the chambers, as well as the flanges by passing a substantially flat sheet of material through the first pair of rollers;

a second roll former having a second pair of rollers for intermediately forming the front wall, the outer side wall, and the rear wall for each of the chambers, as well as the central portion of the continuous front wall, simultaneously, by continuously passing the sheet of material through the second pair of rollers;

a third roll former having a third pair of rollers for exactly forming the front wall, outer side wall, rear wall, and inner side wall of each of the chambers, as well as the central portion of the continuous front wall and the flanges by continuously passing the sheet of material through the third pair of rollers; and simultaneously forming an indentation on the central portion of the continuous front wall; and a fourth roll former having a fourth pair of rollers for bending the sheet of material into a final tubular cross-section by placing edges of the flanges in opposition to one another thereby forming a web between the two chambers' inner side walls, and forming an obtuse angle in the outer side walls with the angle opened towards the inner side walls; the tubular cross-sectional shape achieved by continuously passing the sheet of material through a pair of rollers on a roll former.

* * * * *

UNITED STATES PATENT AND TRADEMARK OFFICE
CERTIFICATE OF CORRECTION

PATENT NO. : 5,934,544
DATED : August 10, 1999
INVENTOR(S) : Yong-ho LEE et al.

It is certified that error appears in the above-identified patent and that said Letters Patent is hereby corrected as shown below:

Claim 1, Col. 6, line 59 after "edges" insert --,--,
        Col. 6, line 60, before "and" insert -- ;--.

Claim 4, Col. 7, line 18, before "said" insert --,--.

Signed and Sealed this

Twenty-second Day of February, 2000

Attest:

Q. TODD DICKINSON

Attesting Officer      Commissioner of Patents and Trademarks